(No Model.)  
2 Sheets—Sheet 1.
C. H. ROECKNER.
PROCESS OF AND APPARATUS FOR CLARIFYING LIQUIDS.
No. 266,204.  
Patented Oct. 17, 1882.
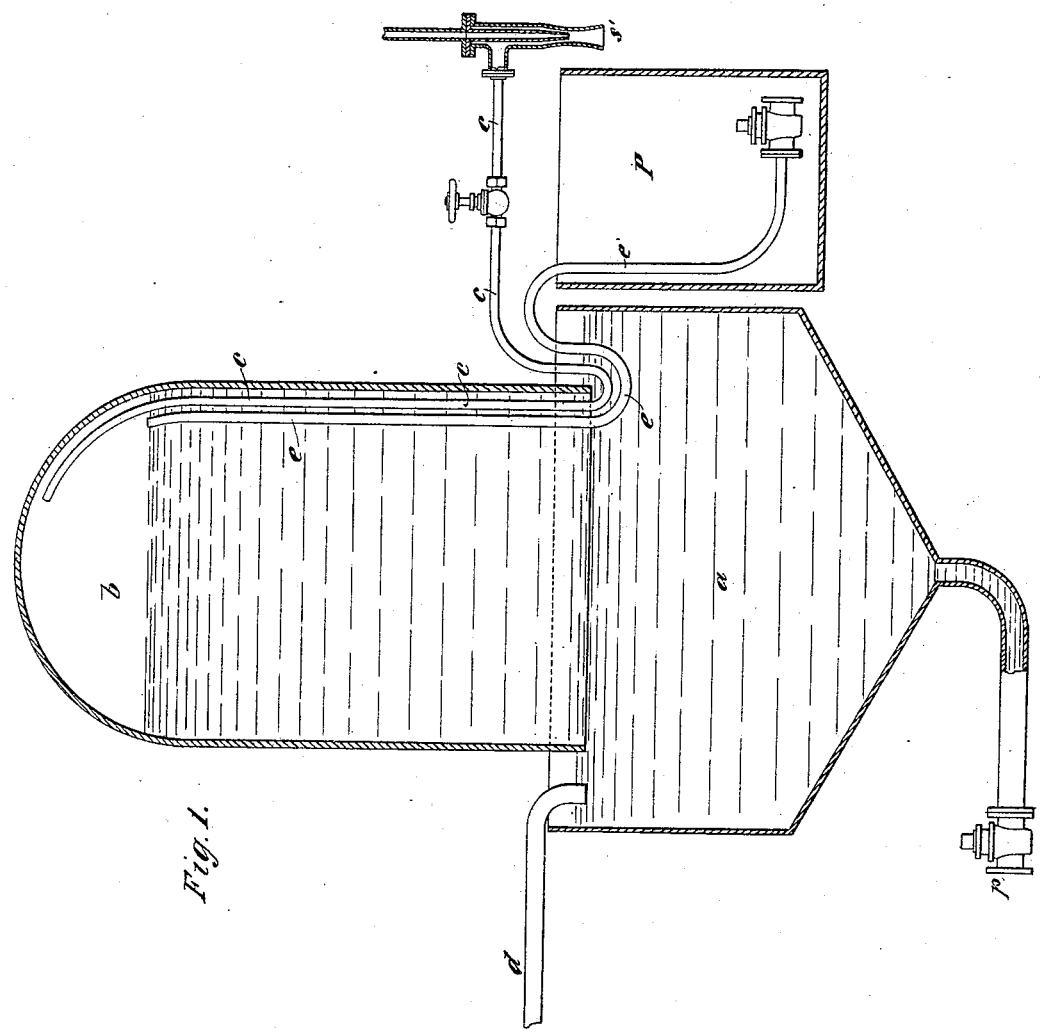

(No Model.) 2 Sheets—Sheet 2.
C. H. ROECKNER.
PROCESS OF AND APPARATUS FOR CLARIFYING LIQUIDS.
No. 266,204. Patented Oct. 17, 1882.
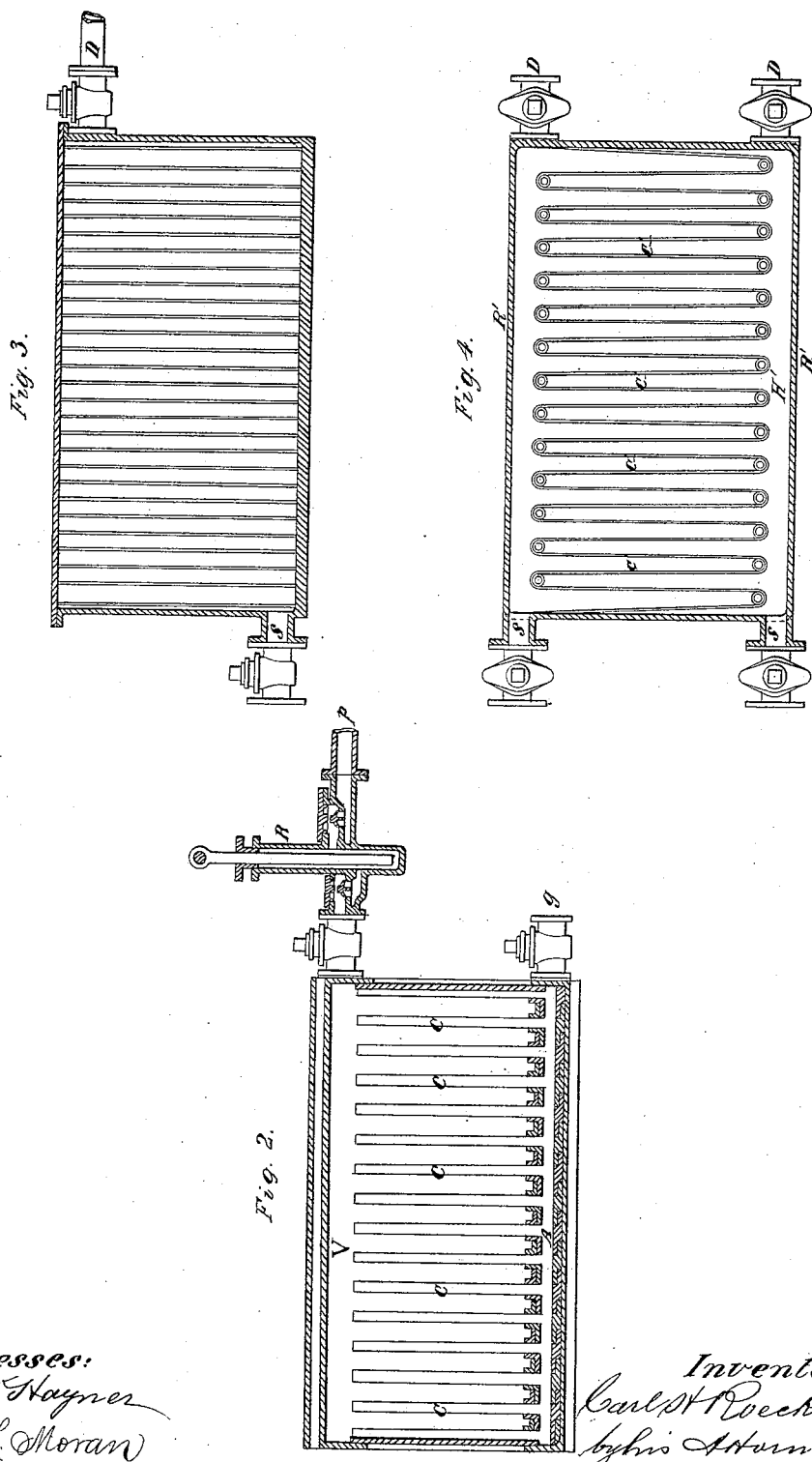

United States Patent Office.

CARL HEINRICH ROECKNER, OF NEWCASTLE-UPON-TYNE, COUNTY OF NORTHUMBERLAND, ENGLAND.

PROCESS OF AND APPARATUS FOR CLARIFYING LIQUIDS.

SPECIFICATION forming part of Letters Patent No. 266,204, dated October 17, 1882.

Application filed July 12, 1882. (No model.)

*To all whom it may concern:*

Be it known that I, CARL HEINRICH ROECKNER, of Newcastle-upon-Tyne, in the county of Northumberland, England, have invented certain Improvements in the Process of and Apparatus for Clarifying Liquids, of which the following is a specification.

My improvement in the process of clarifying liquids consists in gradually forcing liquids—such as dirty river-water, sewage, mill-refuse, or any liquid requiring clarification on a large scale—by atmospheric pressure upward to such height and within such extensive horizontal area that sufficient time is allowed for the sediment to fall during the rise of the liquid before the clarified liquid is drawn off from the top.

My improvement in apparatus consists in the combination of an open-bottomed vessel and pipes and means of exhausting the same, as hereinafter described.

Figure 1 in the drawings is a vertical sectional view of a clarifying apparatus illustrating my invention. Fig. 2 is a vertical section of a filtering apparatus which may be combined with my clarifying apparatus. Fig. 3 is a vertical section, and Fig. 4 a plan, of another kind of filtering apparatus.

The clarifying apparatus, Fig. 1, consists of a receptacle, $b$, of upright cylindrical or any other form, with an open lower end, which dips into the liquid to be clarified. The air is drawn out of $b$ by an ejector, $S'$, by means of a pipe, $c$, or in any other convenient manner. The solid matters fall to the bottom and are left behind. The clarified liquid is drawn off in a siphon-like manner from the top of $b$ by means of pipe $e$, which may either run inside $b$ or outside, so that $b$ and $e$ form a siphon. The liquor thus rising in a large body very slowly gives the solid substances time to fall down or subside, so that only clear liquid reaches the top, wherefrom it is drawn off through $e$, according to the consistency of the liquid and the time required for settling. The size of $b$ will be of larger or smaller dimensions, which is also regulated by the fall of the overflow or the dimensions of $e$.

When it is required to clarify water from rivers, ponds, &c., the clarifier $b$ is arranged to dip into the river or pond, and the outflow through $e$ is retained in a cistern, P, wherefrom it is drawn off as required, while the sediment falls back into the river and goes away with the natural current.

In sewage, mill-refuse, &c., where the accumulated sediment requires removal, the drainage is sent through pipe $d$ or otherwise into a cistern, for instance, like $a$, into which $b$ dips, as before described. The accumulated sediment may be dug out of $a$ or drawn off at the bottom through pipe $p$, or be otherwise removed, and where it is desirable to receive the sediment it is drawn off from $a$ through pipe $p$ by means of a force-pump, R, and forced into a closed cistern, V. (See Fig. 2.) V is divided into a requisite number of compartments by collectors C C, which are connected with an outflow-pipe, A, but which are covered with some filtering material. The water or pure liquid contained in the sediment is thus forced through the collectors into pipe A and discharged through cock $g$, while the sediment remains in compressed cakes between the collectors, which cakes are removed by V being opened, and the operation recommenced when required. Care should be taken that the sediment is not drawn off quicker than the supply of fresh liquor comes in to feed both $e$ and $p$, or $e$ might be closed while $p$ is worked; otherwise the vacuum in $b$ might be lost and the time for a removal of the vacuum wasted. If the vacuum is not carelessly lost, the clarifier must work perpetually.

In cases where the clarified liquid flowing out of $e$ is not sufficiently pure the liquid may be sent from $e$ into a purifying-filter, Figs. 3 and 4.

The purifying-filter has a counter-current filter-box, R', Fig. 4, through a cloth arranged in zigzag, is divided into two compartments, H H', each of which having a feed-pipe, D, and a discharge-pipe, S. If the liquid flows into H, D is opened and S closed, while in H' D is closed and S is opened, so that H retains the mud or dirt, while H' discharges the pure liquid, and should the cloth become dirty D in H' is opened and S closed, while D in H' is closed and S opened. At first the mud will flow out of H; but the liquid will soon become and run pure. Considering that the liquid, having been through $b$, is not able to carry much solid matter but what is very light, the changing of the operation between H and H' will seldom be required.

What I claim as my invention is—

1. The process of clarifying liquids, consisting in raising them by atmospheric pressure above the source of supply and keeping them suspended by such pressure for a sufficient time for the solid matters or impurities to fall back to the source of supply, substantially as herein described.

2. The combination, in an apparatus for clarifying liquids, of the open-bottomed receptacle $b$ and the discharge-pipe $e$, the two constituting a siphon, substantially as herein described.

3. The combination of the open-bottomed receptacle $b$, the discharge-pipe $e$, the two constituting a siphon, and the air exhaust-pipe $c$ and an exhaust device applied to the latter, substantially as described, and as illustrated in the accompanying sheet of drawings.

CARL HEINRICH ROECKNER.

Witnesses:
F. ENGEL,
F. CLAIRMONT.